US009182807B2

(12) United States Patent
Wolski et al.

(10) Patent No.: US 9,182,807 B2
(45) Date of Patent: Nov. 10, 2015

(54) SYSTEMS AND METHODS FOR PREDICTIVE POWER MANAGEMENT IN A COMPUTING CENTER

(71) Applicants: Richard Michael Wolski, Goleta, GA (US); John Brevik, Anaheim, CA (US)

(72) Inventors: Richard Michael Wolski, Goleta, GA (US); John Brevik, Anaheim, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 13/731,414

(22) Filed: Dec. 31, 2012

(65) Prior Publication Data

US 2014/0189410 A1    Jul. 3, 2014

(51) Int. Cl.
    G06F 1/32      (2006.01)
    G06F 9/46      (2006.01)
(52) U.S. Cl.
    CPC ............ *G06F 1/3287* (2013.01); *G06F 1/3206* (2013.01); *G06F 9/46* (2013.01); *Y02B 60/1282* (2013.01)
(58) Field of Classification Search
    CPC ....... G06F 1/3287; G06F 1/3206; G06F 9/46; Y02B 60/1282
    See application file for complete search history.

(56) References Cited

U.S. PATENT DOCUMENTS

| 7,487,504 | B2 * | 2/2009 | Peterson | 718/104 |
| 8,225,119 | B2 * | 7/2012 | Jain et al. | 713/320 |
| 8,245,059 | B2 | 8/2012 | Jackson | |
| 8,904,213 | B2 * | 12/2014 | Chan et al. | 713/320 |
| 2003/0149716 | A1 * | 8/2003 | Peterson | 709/101 |
| 2006/0184287 | A1 | 8/2006 | Belady et al. | |
| 2007/0250838 | A1 | 10/2007 | Belady et al. | |
| 2009/0150695 | A1 * | 6/2009 | Song et al. | 713/323 |
| 2010/0100716 | A1 | 4/2010 | Scott et al. | |
| 2010/0218005 | A1 * | 8/2010 | Jain et al. | 713/300 |
| 2010/0299675 | A1 * | 11/2010 | Yuyitung et al. | 718/105 |
| 2012/0053925 | A1 | 3/2012 | Geffin et al. | |

OTHER PUBLICATIONS

International Search Report received in PCT Application No. PCT/US2013/070790, Dec. 31. 2012, 3 pages.

* cited by examiner

*Primary Examiner* — M Elamin
(74) *Attorney, Agent, or Firm* — Hewlett-Packard Patent Department

(57) ABSTRACT

Aspects and implementations of the present disclosure are directed to systems and methods for predictive power management in a computing center. In general, in some implementations, a system for conserving resources in a multiprocessor computing environment monitors usage of the processors in the environment and maintains a sorted list of usage changes that occur in each of a plurality of periodic intervals. The system uses the sorted list to predict, according to configurable parameters, how many processors will need to be available during a subsequent interval. In some implementations, the monitored intervals are consecutive and immediately prior to the subsequent interval. In some implementations, the usage changes during a periodic interval are determined as the difference between a maximum number of active-busy processors during the periodic interval and an initial number of active-busy processors for the periodic interval.

20 Claims, 5 Drawing Sheets

SYSTEMS AND METHODS FOR PREDICTIVE POWER MANAGEMENT IN A COMPUTING CENTER

FIELD OF THE INVENTION

The present disclosure relates to systems and methods for predictive power management in a computing center.

BACKGROUND

A computing center provides access to a plurality of physical computing machines. Examples of computing centers include data centers or data warehouses, computer clusters, and server farms. Generally, a computing center is designed for a varying level of use such that the typical use is within the computing capacity of the center. When usage is below capacity, idle machines can be operated at a reduced power or even shut down completely. For example, in some computing centers, each physical computing machine is capable of hosting virtual machines. The virtual machines provide various computing services, typically accessible via a network. Each physical machine can typically host multiple virtual machines. When usage is below capacity, some physical machines are idle but consuming energy; these machines can be powered down. A request for a new virtual machine can be handled by an active physical machine if the physical machine has availability, otherwise another physical machine may need to be activated, e.g., powered up. A delay caused by activating a physical machine can create an undesirable lag time in satisfying a request for a new virtual machine. These delays can be avoided by maintaining idle physical machines. However, expending energy on an idle physical machine can be wasteful and expensive.

SUMMARY OF THE INVENTION

Aspects and implementations of the present disclosure are directed to systems and methods for predictive power management in a computing center. In general, in some implementations, a system for conserving resources in a multi-processor computing environment monitors usage of the processors in the environment and maintains a sorted list of usage changes that occur in each of a plurality of periodic intervals. The system uses the sorted list to predict, according to configurable parameters, how many processors will need to be available during a subsequent interval. In some implementations, the monitored intervals are consecutive and immediately prior to the subsequent interval. In some implementations, the usage changes during a periodic interval are determined as the difference between a maximum number of active-busy processors during the periodic interval and an initial number of active-busy processors for the periodic interval.

At least one aspect is directed to a system for conserving resources in a multi-processor computing environment, the system including at least a monitoring system with a network connection, computer memory, and one or more computer processors. The processors are configured to monitor usage of one or more processors in a multi-processor computing environment over a plurality of periodic intervals, wherein each periodic interval has a number of active-busy processors and a number of active-idle processors. The processors are configured to determine, for each periodic interval, from the monitoring, a delta value representing a change in the number of active-busy processors processor during the respective interval. The processors are configured to maintain a sorted list of delta values and determine, from the sorted list, using a configurable quantile and a configurable confidence, a predicted delta value for a subsequent interval. The processors are configured to cause a number of processors in the multi-processor computing environment to transition between a non-active state and an active-idle state, wherein the number of processors transitioned is based on the predicted delta value.

At least one aspect is directed to a method for conserving resources in a multi-processor computing environment. The method includes monitoring, by a data processing system, usage of one or more processors in a multi-processor computing environment over a plurality of periodic intervals, wherein each periodic interval has a number of active-busy processors and a number of active-idle processors. The method includes determining, for each periodic interval, from the monitoring, a delta value representing a change in the number of active-busy processors during the respective interval. The method includes maintaining a sorted list of delta values and determining, from the sorted list, using a configurable quantile and a configurable confidence, a predicted delta value for a subsequent interval. The method includes causing a number of processors in the multi-processor computing environment to transition between a non-active state and an active-idle state, wherein the number of processors transitioned is based on the predicted delta value.

In some implementations monitoring includes observing an initial number of active-busy processors for each periodic interval and observing a maximum number of active-busy processors during each periodic interval. In some implementations, determining a delta value for a periodic interval includes at least calculating the difference between the maximum number of active-busy processors during the periodic interval and the initial number of active-busy processors for the periodic interval. In some implementations, the monitoring system is external to the multi-processor computing environment. In some implementations the periodic intervals are consecutive and the subsequent interval is consecutive to the plurality of periodic intervals. In some implementations, maintaining a sorted list of delta values includes, at least, adding a new value to the list after a new periodic interval and removing an oldest entry from the sorted list. In some implementations, the sorted list of delta values is a linked list. In some implementations, causing a processor to transition between a non-active state and an active-idle state includes one or more of: (i) powering up a non-active processor; (ii) powering down an active-idle processor; (iii) waking up a non-active processor from a low power state; (iv) placing an active-idle processor in a low power state; and (v) sending an instruction to a processor control system. In some implementations, the number of processors caused to transition is equal to the predicted delta value. In some implementations, the subsequent interval begins substantially concurrently with causing a number of processors to transition between a non-active state and an active-idle state.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and embodiments of, methods, apparatuses, and systems for conserving resources in a multi-processor computing environment. The various concepts introduced above and discussed in greater detail below may be implemented in any of numerous ways, as the concepts described are not limited to any particular manner of implementation. Examples of specific implementations and applications are provided primarily for illustrative purposes.

Figure 1:
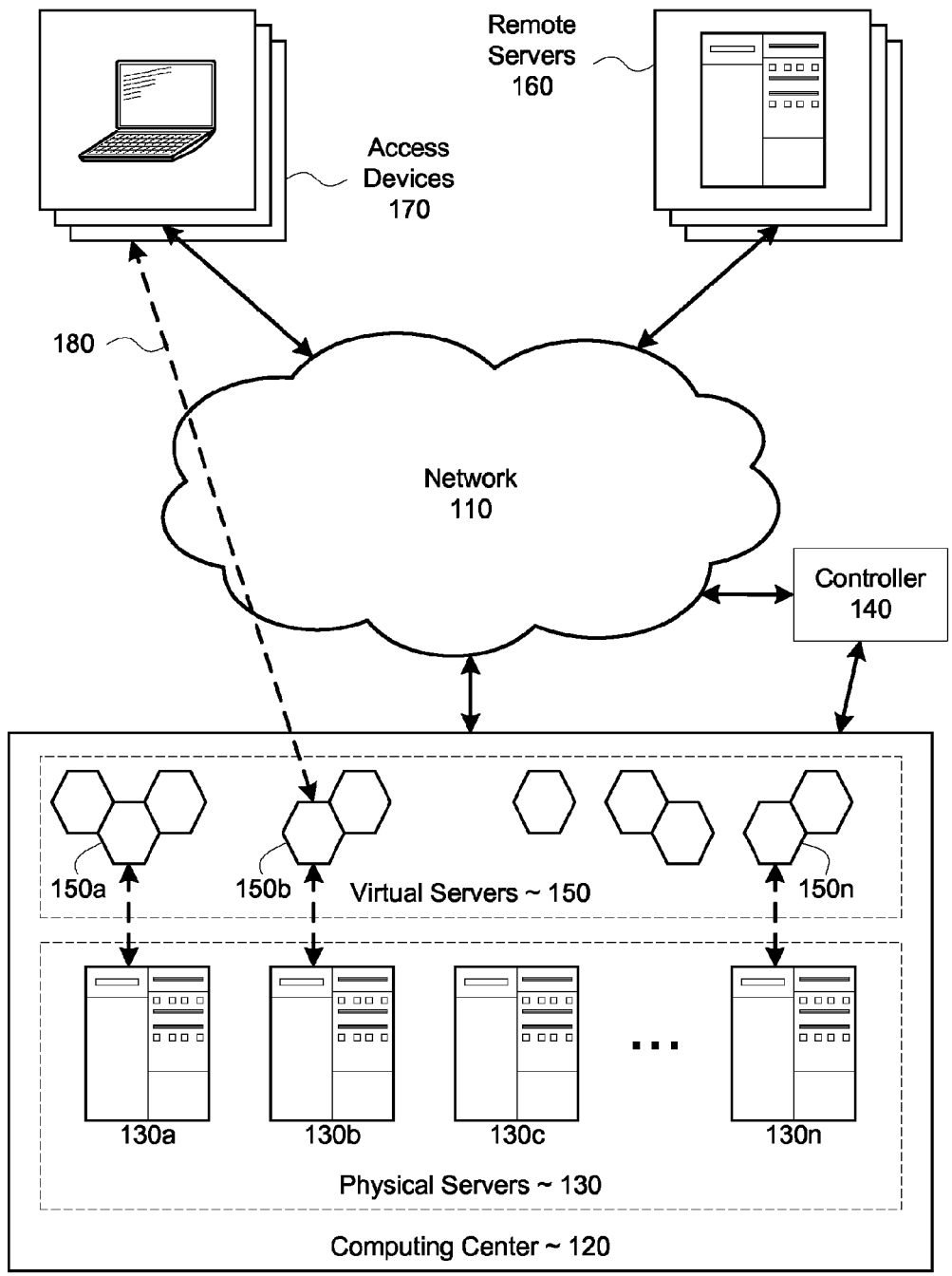
FIG. 1 is a block diagram illustrating an embodiment of a network environment wherein devices can communicate with a computing center via a network.

FIG. 1 illustrates a generalized networked computing environment including a computing center accessible via a network 110. The computing center 120 provides access to physical servers 130 (e.g., physical servers 130a-n). A controller 140 determines which physical servers 130 are active. The physical servers 130 host virtual servers 150 (e.g., virtual servers 150a-n). Remote servers 160 and other access devices 170 access the computing center 120 via the network 110. For example, an access device 170 access virtual server 150b via a network path 180.

Access devices 170 may be any computing device. For example, an access device 170 may be a personal computer, a server, a laptop, a notebook, a tablet, a personal digital assistant, a smart phone, a gaming device, a television, a set-top box or other special purpose computing platform, or any other computing device used in connection with a network. Computing devices are described in more detail with respect to FIG. 2. Generally, an access device 170, or a user thereof, is a consumer of services provided by the computing center 120. The user of an access device 170 may be using services offered by a vendor and the vendor may provide those services via the computing center 120 such that the user is unaware or unconcerned with the nature of the computing center 120. An example is a user accessing a web site hosted by a virtual server 150b—the user consumes the service without concern for the underlying infrastructure.

Remote Servers 160 may be any computing device. A remote server 160 may be equivalent to an access device 170. Generally, a user or administrator of a remote server 160 communicates with the computing center 120 from an administrative perspective, e.g., to configure a service for use by access devices 170. For example, a corporate entity may use remote servers 160 to set up a web site on a virtual server 150 hosted by a physical server 130 in the computing center 120 and an access device 170 may fetch a web page from the web site, e.g., via network path 180. An administrator or user of a remote server 160 may have more concern for the underlying infrastructure than a user of an access device 170.

The computing center 120 provides access to a plurality of physical computing machines 130. Examples of computing centers include data centers or data warehouses, computer clusters, and server farms. As illustrated in FIG. 1, the computing center 120 is a server farm operating physical servers 130 hosting virtual servers 150. However, in some implementations the physical servers 130 provide services other than virtual machine hosting. Generally, the computing center 120 is responsible for the maintenance of the physical servers 130. The computing center 120 provides infrastructure such as housing, cooling, energy, and security. While illustrated as a single unit, the computing center may be an aggregation of multiple locations operating as a single center. For example, a computing center 120 may be a composite of servers in geographically diverse locations. Such diversity provides protection against disruption from local events. For example, a natural disaster at one location would leave the rest of the locations operational and the computing center could continue to provide service, albeit at a reduced capacity. Geographic diversity can also provide leverage in reducing energy costs.

The physical servers 130 operated by the computing center 120 may each be any computing device. As illustrated in FIG. 1, the physical servers host virtual servers 150. Each physical server 130 can host a plurality of virtual servers 150. For example, a physical server 130a may host a virtual server 150a and additional virtual servers. The physical servers may share resources within the computing center 120. For example, the physical servers 130 may access a shared storage area network (SAN) hosted within the computing center 120.

In some implementations, a controller 140 directs requests to individual physical servers 130, causes physical servers 130 to change availability state, and generally controls the computing center 120. Changing availability state may include causing a physical server 130 to power up, power down, enter a low-power state, restart, start a virtual server 150, stop a virtual server 150, or start or stop any other service. The controller may be a physical server 130 in the computing center 120. The controller may be a virtual server 150 running on a physical server 130. The controller may be an external system, such as the controller 140 illustrated in FIG. 1. A controller 140 may be within the computing center 120, may communicate with the computing center 120 via a private network or dedicated data link, or the controller 140 may use a shared network 110 to communicate with the computing center 120. In some implementations, the physical servers coordinate, e.g., via a back-plane network (not shown), to assign requests to individual servers. In some implementations, the controller 140 monitors activity within the computing center 120 and can provide statistics. Statistics may include request rates, traffic flow, availability, energy consumption, and a count of idle physical servers 130.

The virtual servers 150 are virtual machines hosted by physical servers 130. Generally, each virtual server 150 may be created as needed and released when no longer needed. A vendor operating the computing center 120 may lease processing time on the physical servers 130, wherein the processing time is used by the virtual servers 150. Generally, each physical server 130 hosts one or more virtual servers 150. However, a virtual server 150 may use the resources of multiple physical servers 130, e.g., to create a virtual multi-processor server. When a new virtual server is needed, a physical server 130n allocates resources to a new virtual server 150n.

An example of a network path 180 is illustrated in FIG. 1 as a dashed arrow between an access device 170 and a virtual server 150b, through the network 110. Virtual machines 150 appear to access devices 170 as any other server on the network 110. The network path 180 may be routed through network address translation (NAT) devices, firewalls, network routers and switches. The computing center 120 may direct data traffic, e.g., network path 180, as needed. For example, a request may arrive requiring a new virtual machine and the controller 140 may request a physical server 130 to host a new virtual server 150 to satisfy the request. The computing center 120 can then direct data traffic to the new virtual server, as illustrated by the network path 180.

The network 110 can be a local-area network (LAN), such as a company intranet, a metropolitan area network (MAN), or a wide area network (WAN), such as the Internet and the World Wide Web. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there are multiple networks 110 between participants, for example a smart phone 170c typically communicates with Internet servers via a wireless network connected to a private corporate network connected to the Internet. The network 110 may be public, private, or a combination of public and private networks. The topology of the network 110 may be a bus, star, ring, or any other network topology capable of the operations described herein. The network 110 can be used to access the auction server 150 by at least one user device 170, such as a laptop, desktop, tablet, electronic pad, personal digital assistant, smart phone, video game device, television, kiosk, or portable computer.

Figure 2:
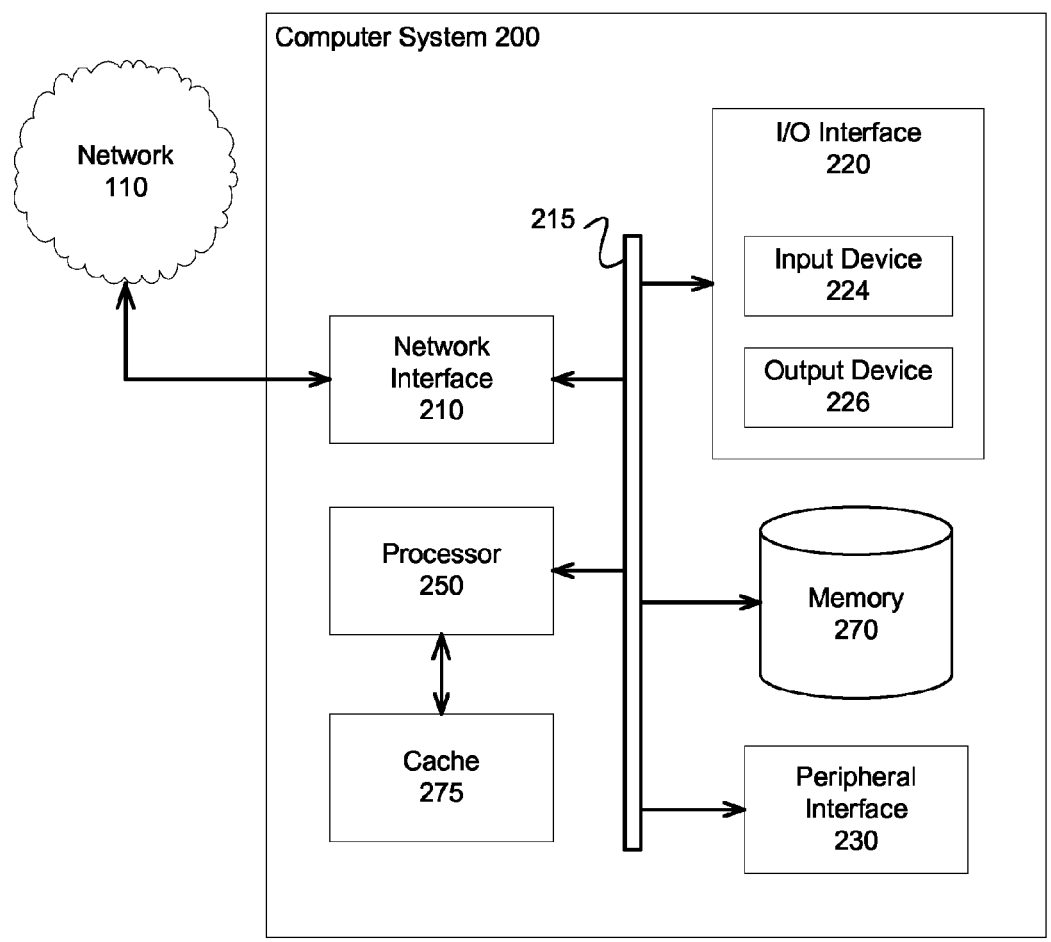
FIG. 2 is a block diagram illustrating a general architecture of a computer useful in connection with the systems and methods described herein.

FIG. 2 illustrates an example computer system 200 suitable for use in implementing the computerized components described herein. The example computer system 200 includes one or more processors 250 in communication, via a bus 215, with one or more network interfaces 210 (in communication with the network 110), I/O interfaces 220 (for interacting with a user or administrator), and memory 270. The processor 250 incorporates, or is directly connected to, additional cache memory 275. In some uses, additional components are in communication with the computer system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 use the same hardware, for example, as in a touch screen.

In some implementations the access devices 170 illustrated in FIG. 1 are constructed to be similar to the computer system 200 of FIG. 2. For example, a user of an access device 170 may interact with an input device 224, e.g., a keyboard, mouse, or touch screen, to access an auction, e.g., via a web page, over the network 110. The interaction is received at the user's device's interface 210, and responses are output via output device 226, e.g., a display, screen, touch screen, Braille output, or speakers. The output may be comprised of a mix of data received from virtual servers 150, remote servers 160, or from other systems.

In some implementations, one or more of the servers (e.g., the physical servers 130, the controller 140, and/or the remote servers 160) illustrated in FIG. 1 are constructed to be similar to the computer system 200 of FIG. 2. In some implementations, a server may be made up of multiple computer systems 200. In some implementations, a server may be a virtual servers, for example, a cloud based server. A server as illustrated in FIG. 1 may be made up of multiple computer systems 200 sharing a location or distributed across multiple locations. The multiple computer systems 200 forming a server may communicate using the user-accessible network 110. The multiple computer systems 200 forming a server may communicate using a private network, e.g., a network distinct from the user-accessible network 110 or a virtual private network within the user-accessible network 110.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some implementations, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennae, signal receivers, measurement devices, and data conversion devices. In some uses, peripherals include a network interface and connect with the computer system 200 via the network 110 and the network interface 210. For example, a printing device may be a network accessible printer.

The computer system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a gaming device such as a PlayStation (PS 1/2/3/x) or Personal PlayStation Portable (PSP) device manufactured by the Sony Corporation of Tokyo, Japan, a Nintendo, Game Boy, or Wii device manufactured by Nintendo Co., Ltd., of Kyoto, Japan, or an XBox or XBox 360 device manufactured by the Microsoft Corporation of Redmond, Wash. For example, the computer system 200 may comprise a tablet device such as one of the iPod family of devices manufactured by Apple Computer of Cupertino, Calif.

Figure 3:
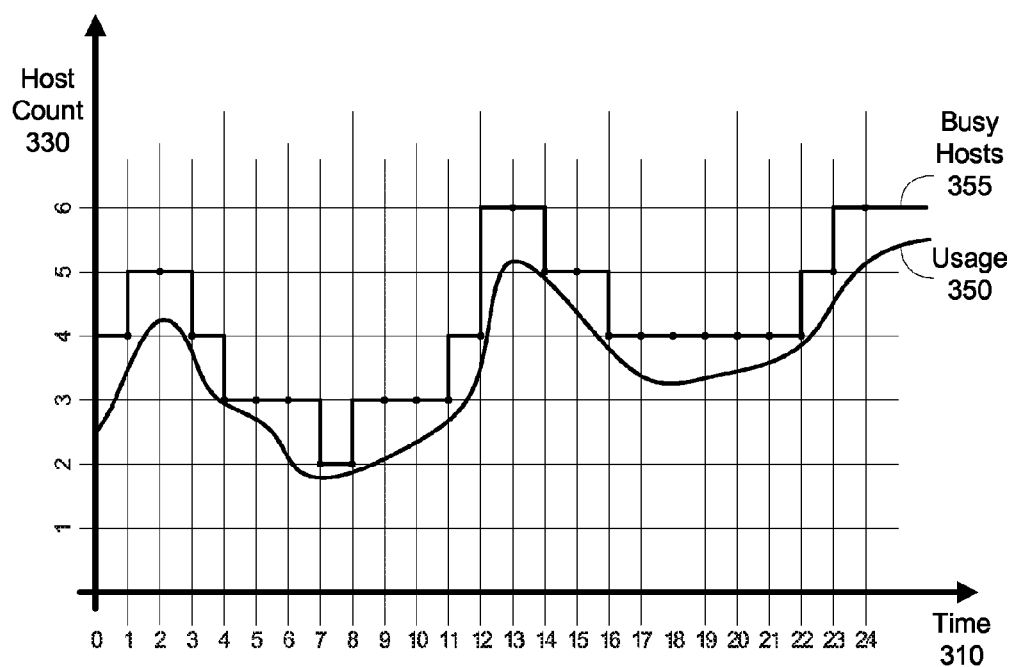
FIG. 3 is a graph illustrating host usage over time.

FIG. 3 is a graph illustrating host usage over time. The graph illustrates units of time along the horizontal axis 310 and a host count on the vertical axis 330. A usage line 350 tracks a hypothetical usage level over time and a busy hosts line 355 tracks the number of hosts busy supporting the hypothetical usage for each unit of time. In this hypothetical, at time 0, three hosts are serving a usage level of two hosts at full capacity and one host at roughly half capacity. At the end of the first interval (referred to herein as an epoch), the usage level has grown and a fourth host had to be utilized. Thus the number of busy hosts, as shown by the busy hosts line 355, for the first epoch is four.

The horizontal axis 310 of the graph illustrated in FIG. 3 represents the passage of time. The graph is a hypothetical illustration, so no units are used; however, the length of an epoch (the time for an interval) may be very small (e.g., milliseconds, nanoseconds, picoseconds) to very large (e.g., hours, days, weeks, months). In many discussions, it is helpful if the epoch is longer than the typical transition or start-up time for a physical machine. However, an excessively large epoch may limit usefulness.

The vertical axis 330 of the graph illustrated in FIG. 3 represents the host count, i.e., the number of hosts active or utilized. The graph is a hypothetical illustration. Generally, a host is either in use or not in use, but a host in use may not be in use at full capacity. That is, the usage line 350 in between host counts represents a fractional usage while the busy host line 355 always indicates an integer number of hosts in use. A host may be active but idle, that is, a host may be available but not busy. Thus a simple way to avoid any request delays is to keep all six illustrated hosts available for the entire graphed time. This approach would waste energy for each unit of time where a host was available but unused. For example, in the first epoch, only four hosts are used leaving two hosts unused. The sixth host is not used until after time 12. Therefore, assuming the future use were somehow known, it may be that the sixth host could be left in an low powered or unpowered state until sometime around time 11 or time 12. Future use cannot be known perfectly, but may be predicted. It may be that a prediction system determines that it is unlikely to need more than five hosts, in which case there may be some delay when the usage rises above five hosts while the sixth host becomes available. An administrator may determine that this delay is tolerable if sufficiently rare. Thus, while the usage 350 falls within four hosts for the majority of the time, an administrator may keep five hosts active. The occasional usage 350 or five hosts would then suffer no delays. A prediction model may do even better by determining the probability that a subsequent epoch will require more hosts than presently available and thus only activating additional hosts when there is a probability that they will be needed (such probability above some threshold).

Figure 4:
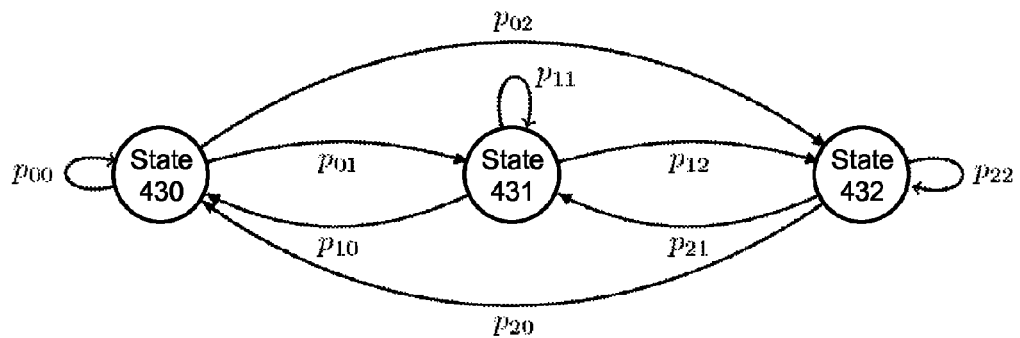
FIG. 4 is a state diagram illustrating probability of transitions.

FIG. 4 is a state diagram illustrating probabilities of transitions between states. The figure illustrates three states each representing the number of busy physical servers 130. For example, in a simplified 2-machine system, state 430 represents zero busy machines, state 431 represents one busy machine, and state 432 represents two busy machines. The arrows connecting the states are labeled pij, where i is the number of current busy machines and j is the number of potential future busy machines, such that pij is the probability of transitioning from i busy machines to j busy machines. For example, p00 is the probability of a transition from zero busy machines (state 430) to zero busy machines (state 430); p01 is the probability of a transition from zero busy machines (state 430) to one busy machine (state 431); and p12 is the probability of a transition from one busy machine (state 431) to two busy machines (state 432). These probabilities form Markov chains.

For a system with n machines, one can build a mathematical model by polling the system to see how many machines are busy at regular time intervals. The duration of each time interval can be called an epoch, which should be greater than the typical startup time for a machine. The sequence of machine counts $b_k$ (b busy machines in the $k^{th}$ interval) can be modeled as a Markov chain with states 0, 1, . . . , n each standing for the number of busy machines and transition probabilities $p_{ij}$ representing the probability, given that $b_k=i$, that $b_{k+1}=j$. FIG. 3 illustrates the model for n=2. Note that the Markov model requires, in principle, accurate estimation of all $(n+1)^2$ parameters $p_{ij}$. However, analysis of actual production logs reveals alternatives.

Data from actual production logs shows that the transition probabilities $p_{ij}$ are essentially dependent only on the difference i−j in the number of busy machines from one time step to the next. That is, for example, the probability of changing from two to four busy machines is approximately the same as that of changing from five to seven. Rather than using the Markov model described above, one might consider the sequence of differences, say $y_k=b_{k+1}-b_k$, which are positive and negative integers between −n and n, inclusive.

Note that $y_k$ measures only approximately the number of machines that need to be left idle at the beginning of the $k^{th}$ epoch to accommodate the new requests that will arrive during that epoch. For example, $y_k$ fails to take into account the machines that may become idle (and thus offset the number of new machines needed) during the epoch. For example, if we leave one machine idle, then requests come in requiring two more machines, then a request terminates and leaves a machine idle, then $y_k=1$ but one of the first two requests still experiences a delay. We therefore define a related sequence $\{x_k\}$ of the number of idle machines needed at the beginning of epoch k to meet all incoming requests without delay. Note that $x_k \geq y_k$ (in the previous example $x_k=2$) and that $x_k=y_k$ in any epoch for which no machine becomes idle. The sequence $\{x_k\}$ has the same independence properties as described for $\{y_k\}$ above; in our real-world log data, the $r^2$ value is always less than 0.02, where r is the Pearson correlation of $x_k$ on the sequence $b_k$ of busy machines at the beginning of epoch k. This reflects an extremely small effect of $b_k$ on $x_k$. The autocorrelation structure of the number of machines needed ($x_k$) is also quite minimal—the first autocorrelation in all test cases was less than 0.0002. Therefore, we can treat $x_k$ as an independent identically distributed sample from a random variable x.

Given the sequence $x_1, \ldots, x_t$, (the number of machines needed over a series of epochs), we can identify an upper confidence bound for $x_{t+1}$, in the sense that a number of machines $x_{t+1}$ has an acceptable probability of being sufficient. For example, it may be acceptable to have a delay in up to 10% of the epochs. We then seek a bound for the 0.9 quantile of the random variable x, which can be done (for a given level of confidence, which we take to be 95%). To accomplish this, proceed as follows: Arrange the $x_i$ in increasing order and label them as $x_{(1)}; x_{(2)}, \ldots, x_{(t)}$. For each value of k, $0 \leq k \leq t$, the probability that no more than k of these values is less (assuming randomness) than the $90^{th}$ population percentile is equal to the binomial distribution:

$$\sum_{i=0}^{k} \binom{t}{i} 0.1^i \cdot 0.9^{t-i}$$

Find the largest k for which this sum is ≤0.05 and use $x_{(k)}$ as the confidence bound. For larger sample sizes, this calculation can become unwieldy, in which case it may be reasonable to resort to the normal approximation to the binomial distribution. The determined $x_{(k)}$ would be the number of idle machines to be left available in order to accommodate incoming requests without delays.

To keep the per-request failure rate at the desired level, interpolate the appropriate quantile based on the ration of the chosen time interval and the average request interarrival time. For example, the interpolation can be a linearization based on an assumption that the request arrivals follow a Posson process. While not literally true, this assumption can serve as a good approximation. Thus, if we want to have no more than 10% of the requests delayed, we can choose the $99^{th}$ percentile of the $\{x_k\}$, rather than the $90^{th}$ percentile. Selecting the $99^{th}$ percentile properly reflects a need for ten successful epochs for every one successful request.

Figure 5:
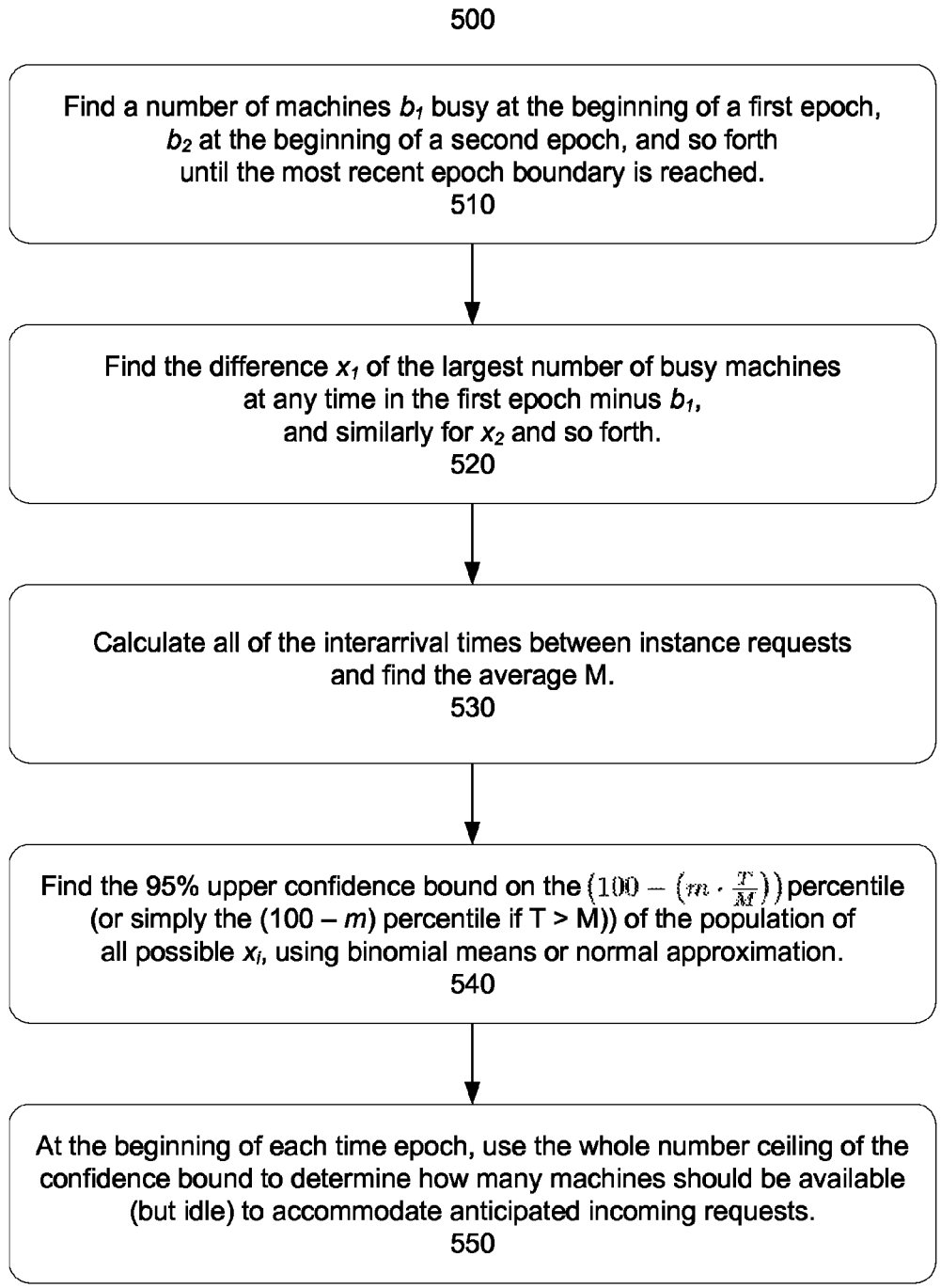
FIG. 5 is a flow diagram illustrating a method for predicting a number of machines needed.

FIG. 5 is a flow diagram illustrating an example method 500 for predicting a number of machines needed. The example method 500 uses tunable parameters T and m, where T is a time value of an epoch for set polling intervals and m is a percentage of requests for which delay can be tolerated. At step 510, we find a number of machines $b_1$ busy at the beginning of a first epoch, $b_2$ busy at the beginning of a second epoch, and so forth until the most recent epoch boundary is reached. At step 520, we find the difference ($x_1$) of the largest number of busy machines at any time in the first epoch minus $b_1$, and similarly for $x_2$ and so forth. At step 530, we calculate all of the interarrival times between instance requests and find the average time between requests, M. At step 540, we find the 95% upper confidence bound on the (100−(mT/M)) percentile of the population of all possible $x_i$, using binomial means or normal approximation. At step 550, at the beginning a time epoch, we use the whole number ceiling of the confidence bound to determine how many machines should be available (although idle) to accommodate anticipated incoming requests. These steps may be implemented, for example, by the controller 140. The controller 140 can log each request for a new virtual machine 150, logging the request start time, the physical machine 130 hosting the new virtual machine 150, and the end time when the virtual machine 150 is terminated.

At step 510, the controller 140 finds a number ($b_t$) of physical servers 130 that are busy at the beginning of an epoch t. For example, using the graph of FIG. 3, at an epoch beginning at time 2, five host servers are busy (although only four host servers are busy at time 3). In some implementations, the controller 140 polls the physical hosts 150 at regular intervals marking the start of each epoch. In some implementations, the controller 140 logs every request and tracks which physical servers 150 are busy at the start of each epoch.

At step 520, the controller 140 finds the difference (x) of the largest number of busy machines at any time in each epoch minus the number (b) of physical servers 130 that were busy at the beginning of the respective epoch. That is, the controller 140 identifies the peak usage level in each epoch and determines a delta between the initial usage at the start of each epoch and the peak usage for the epoch. Referring again to FIG. 3, assume an epoch were four time units. A first epoch begins at time 0 and ends at time 4, a second epoch begins at time 4 and so on. The number of hosts in use at the beginning of the first epoch (at time 0) is three, but by time 2 the number is up to five. Thus the delta is an additional two servers. Note that by the end of the epoch, the number of non-idle host servers is back to three. In some implementations, the controller 140 polls the physical hosts 150 at regular intervals within an epoch to determine the number of non-idle physical hosts. In some implementations, the controller 140 logs every request and determines a maximum number of physical servers 150 the are busy within each epoch. In some implementations, the controller 140 maintains a sorted list L of the delta values for each epoch (that is, the delta between the initial number of busy servers and the maximum number of busy servers, for each epoch).

At step 530, the controller 140 calculates an average M of the inter-arrival times between instance requests. Thus, M is the average time between requests. In some implementations, the average M is maintained from a fixed initial time. In some implementations, the average M is calculated based on the most recent requests, e.g., using only the arrival times for the last 1,000 requests. In some implementations, the average M is calculated based on the requests arriving within the most recent epochs, e.g., using only the arrival times for the requests arriving in the last twenty epochs (or in the last hour, which would be equivalent to the last twenty 3-minute epochs).

At step 540, the controller 140 finds a 95% upper confidence bound on the $$\left(100 - \left(m \cdot \frac{T}{M}\right)\right)$$

percentile—or, if T>M, the (100−m) percentile—of the population of all possible $x_i$, using binomial means or normal approximation, as described above. For example, at the end of the $i^{th}$ epoch, using the probability mass function for a binomial distribution:

(i) if T<M, i.e., there may be epochs with no requests, find the largest whole number k such that:

$$\sum_{i=0}^{k} \binom{t}{i} \left(0.1 \frac{Tm}{M}\right)^i \cdot \left(1 - .01 \frac{Tm}{M}\right)^{t-i} < 0.05$$

(ii) if T≥M, i.e., the length of time for an epoch is greater than the average time between requests, find the largest whole number k such that:

$$\Sigma_{i=0}^{k} \binom{t}{i}(0.01m)^i(1-0.01m)^{t-i} < 0.05$$

Using the sorted list L of the delta values for each epoch maintained in step 520, the $k^{th}$ smallest element of L gives a 95% upper confidence bound B for the max $$\left(100 - m, 100 - m \cdot \frac{T}{M}\right)$$

percentile for the sequence of differences x.

At step 550, at the beginning a time epoch t+1, we use the confidence bound, as found in step 540, rounded up to the nearest whole number, to determine how many machines should be available (although idle) to accommodate anticipated incoming requests. For example, the confidence bound B represents the number of machines to be switched on, although idle, at the beginning of the new epoch. In some implementations, the number of machines to switched on is reduced by the number of idle machines presently on.

In some implementations, the described predictions can be incorporated into a monitoring system for predictive power management.

Figure 6:
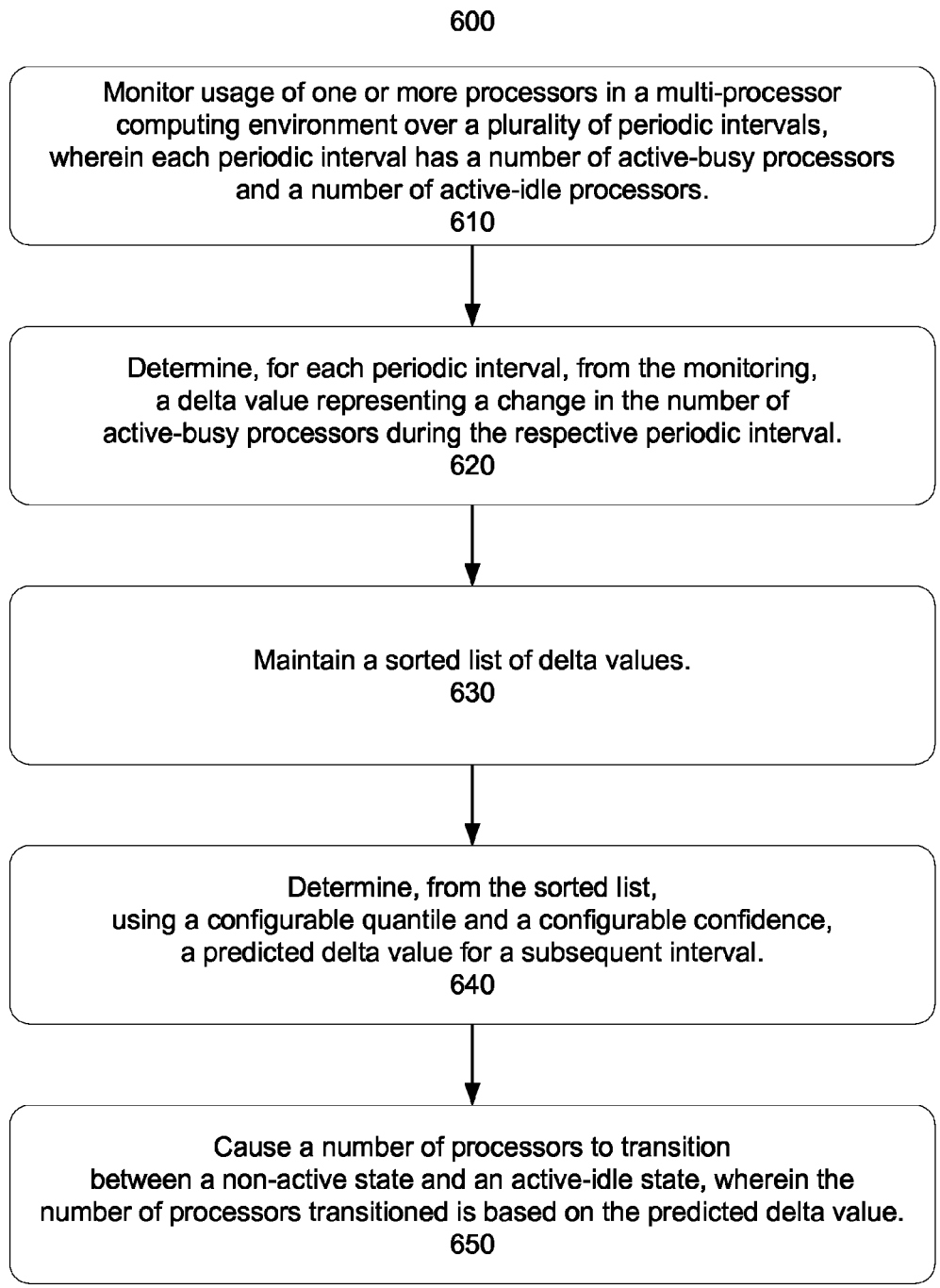
FIG. 6 is a flow diagram illustrating a method for predictive power management.

FIG. 6 is a flow diagram illustrating a method for predictive power management. At step 610, a monitoring system (e.g., controller 140 may act in a monitoring capacity), monitors usage of one or more processors in a multi-processor computing environment over a plurality of periodic intervals, wherein each periodic interval has a number of active-busy processors and a number of active-idle processors. At step 620, the monitoring system determines, for each periodic interval, a delta value representing a change in the number of active-busy processors during the respective interval. At step 630, the monitoring system maintains a sorted list of processor usage changes. At step 640, the monitoring system determines a predicted delta value for a subsequent interval. At step 650, the monitoring system causes a number of processors to transition between a non-active state and an active-idle state, wherein the number of processors transitioned is based on the predicted delta value.

At step 610, the monitoring system monitors usage of one or more processors in a multi-processor computing environment over a plurality of periodic intervals, wherein each periodic interval has a number of active-busy processors and a number of active-idle processors. In some implementations, the monitoring includes at least observing an initial number of active-busy processors for each periodic interval and observing a maximum number of active-busy processors at any one moment during each periodic interval. A processor is considered active-idle if it has no substantial tasks and is available to satisfy requests without delay, e.g., a delay caused by waking-up from a low power sleep state or by powering-up from an off state.

At step 620, the monitoring system determines, for each periodic interval, a delta value representing a change in the number of active-busy processors during the respective interval. For example, at the beginning of each interval, the maximum number of active-busy processors is equal to an initial number of active-busy processors. As additional processors become active-busy, the maximum number of active-busy processors increases. The delta value is the difference between the initial state and maximum number of active-busy processors during the respective interval.

At step 630, the monitoring system maintains a sorted list of processor usage changes. In some implementations, a linked list is used to maintain the sorted list. In some implementations, the sorted list has a maximum size. When the list is full, the oldest entry is removed to make space for a new entry.

At step 640, the monitoring system determines, from the sorted list maintained in step 630, using a configurable quantile and a configurable confidence, a predicted delta value for a subsequent interval. For example, the quantile may be 90% and the configurable confidence may be 95%. This represents a 95% likelihood that at least 90% of the intervals will not require additional processors to become active. A change in the configured quantile will affect the percentage of intervals that may experience delays while additional processors become active. A change in the configured confidence will affect the likelihood that the quantile percentage is accurate. In some implementations the method 500 illustrated in FIG. 5 and described above is used to calculate an upper bound for a likely change within a desired confidence level.

At step 650, the monitoring system causes a number of processors to transition between a non-active state and an idle active state, wherein the number of processors transitioned is based on the predicted delta value. If the predicted delta indicates that additional processors will be needed during the next periodic interval, then additional processors are activated; if the predicted delta indicates that fewer processors will be needed, then some active-idle processors are de-activated. In some implementations, the monitor (or a controller) causes a processor in the multi-processor computing environment to transition between a non-active state and an active-idle state by powering up a non-active processor, powering down an active-idle processor, waking up a non-active processor from a low power state, placing an active-idle processor in a low power state, or sending an instruction to a processor control system, which may be separate. In some implementations, the monitor or controller waits for processors to become idle before deactivating them. In some implementations, the monitor or controller actively redirects traffic away from a processor to cause it to become idle. In some implementations, the monitor or controller designates a processor for deactivation and routes new requests away from the designated processor, but allows the processor to continue handling current requests.

The number of processors transitioned is based on the predicted delta and may be equal to the predicted delta. For example, if u processors are active-busy and v processors are active-idle, then a prediction that $\Delta$ processors will be needed in the next interval would cause $\Delta-v$ more processors to be activated. If v=0, then the number of processors transitioned is equal to the predicted delta. In some implementations, the monitoring system causes the processors to transition at the start of the next periodic interval. In some implementations, the exact timing of the transition need not be precise and may occur within some reasonable margin of, somewhat or substantially concurrently with, the end of a periodic interval and the beginning of the subsequent periodic interval.

In some implementations, the monitor or controller (e.g., controller 140) provides statistical data that may be displayed to an administrator or used by other tools. For example, in some implementations, the data may be used to predict, by interpolation, when a computer center 120 may reach full capacity. In some implementations, the data may be used to predict power consumption for a computer center 120. Power consumption predictions can be used to negotiate reduced energy costs.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C#, PROLOG, or in any byte code language such as JAVA. The software programs may be stored on or in one or more articles of manufacture as object code.

Having described certain embodiments of systems and methods for conserving resources in a multi-processor computing environment, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for conserving resources in a multi-processor computing environment, the method comprising:
    monitoring, by a data processing system, usage of one or more processors in a multi-processor computing environment over a plurality of periodic intervals, wherein each periodic interval has a number of active-busy processors and a number of active-idle processors;

determining, for each periodic interval, from the monitoring, a delta value representing a change in the number of active-busy processors during the respective interval;

maintaining a sorted list of delta values;

determining, from the sorted list, using a configurable quantile and a configurable confidence, a predicted delta value for a subsequent interval; and causing a number of processors in the multi-processor computing environment to transition between a non-active state and an active-idle state, wherein the number of processors transitioned is based on the predicted delta value.

2. The method of claim 1, wherein monitoring comprises observing an initial number of active-busy processors for each periodic interval and observing a maximum number of active-busy processors during each periodic interval.

3. The method of claim 2, wherein determining a delta value for a periodic interval comprises calculating the difference between the maximum number of active-busy processors during the periodic interval and the initial number of active-busy processors for the periodic interval.

4. The method of claim 1, wherein the data processing system is external to the multi-processor computing environment.

5. The method of claim 1, wherein the periodic intervals are consecutive and the subsequent interval is consecutive to the plurality of periodic intervals.

6. The method of claim 1, wherein maintaining a sorted list of delta values comprises adding a new value to the list after a new periodic interval and removing an oldest entry from the sorted list.

7. The method of claim 1, wherein the sorted list of delta values is a linked list.

8. The method of claim 1, wherein causing a processor to transition between a non-active state and an active-idle state comprises one of:
  (i) powering up a non-active processor;
  (ii) powering down an active-idle processor;
  (iii) waking up a non-active processor from a low power state;
  (iv) placing an active-idle processor in a low power state; and
  (v) sending an instruction to a processor control system.

9. The method of claim 1, wherein the number of processors caused to transition is equal to the predicted delta value.

10. The method of claim 1, wherein the subsequent interval begins substantially concurrently with causing a number of processors to transition between a non-active state and an active-idle state.

11. A system for conserving resources in a multi-processor computing environment, the system comprising:
  a monitoring system comprising a network connection, computer memory, and one or more computer processors configured to:
    monitor usage of one or more processors in a multi-processor computing environment over a plurality of periodic intervals, wherein each periodic interval has a number of active-busy processors and a number of active-idle processors;
    determine, for each periodic interval, from the monitoring, a delta value representing a change in the number of active-busy processors processor during the respective interval;
    maintain a sorted list of delta values;
    determine, from the sorted list, using a configurable quantile and a configurable confidence, a predicted delta value for a subsequent interval; and
    cause a number of processors in the multi-processor computing environment to transition between a non-active state and an active-idle state, wherein the number of processors transitioned is based on the predicted delta value.

12. The system of claim 11, wherein the one or more processors are configured to monitor usage by observing an initial number of active-busy processors for each periodic interval and observing a maximum number of active-busy processors during each periodic interval.

13. The system of claim 12, wherein the one or more processors are configured to determine a delta value for a periodic interval by calculating the difference between the maximum number of active-busy processors during the periodic interval and the initial number of active-busy processors for the periodic interval.

14. The system of claim 11, wherein the monitoring system is external to the multi-processor computing environment.

15. The system of claim 11, wherein the periodic intervals are consecutive and the subsequent interval is consecutive to the plurality of periodic intervals.

16. The system of claim 11, wherein the one or more processors are configured to maintain a sorted list of delta values by adding a new value to the list after a new periodic interval and removing an oldest entry from the sorted list.

17. The system of claim 11, wherein the sorted list of delta values is a linked list.

18. The system of claim 11, wherein the one or more processors are configured to cause a processor in the multi-processor computing environment to transition between a non-active state and an active-idle state via one of:
  (i) powering up a non-active processor;
  (ii) powering down an active-idle processor;
  (iii) waking up a non-active processor from a low power state;
  (iv) placing an active-idle processor in a low power state; and
  (v) sending an instruction to a processor control system.

19. The system of claim 11, wherein the number of processors transitioned is equal to the predicted delta value.

20. The system of claim 11, wherein the subsequent interval begins substantially concurrently with when the monitoring system causes a number of processors in the multi-processor computing environment to transition between a non-active state and an active-idle state.

* * * * *